United States Patent
Choo et al.

(10) Patent No.: US 9,221,122 B2
(45) Date of Patent: Dec. 29, 2015

(54) METHOD OF CONTROLLING A LASER BEAM ANNEALING APPARATUS TO MANUFACTURE THIN FILM TRANSISTOR SUBSTRATE

(71) Applicant: SAMSUNG DISPLAY CO., LTD., Yongin, Gyeonggi-Do (KR)

(72) Inventors: Byoung-Kwon Choo, Yongin (KR); Cheol-Ho Park, Yongin (KR); Hee-Geun Son, Yongin (KR); Do-Yeob Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 113 days.

(21) Appl. No.: 13/923,346

(22) Filed: Jun. 20, 2013

(65) Prior Publication Data

US 2014/0260430 A1    Sep. 18, 2014

(30) Foreign Application Priority Data

Mar. 18, 2013    (KR) .................. 10-2013-0028818

(51) Int. Cl.
*H01S 3/00* (2006.01)
*B23K 26/04* (2014.01)
*B23K 26/03* (2006.01)

(52) U.S. Cl.
CPC ............. *B23K 26/048* (2013.01); *B23K 26/032* (2013.01)

(58) Field of Classification Search
None
See application file for complete search history.

(56) References Cited

U.S. PATENT DOCUMENTS

| | | | |
|---|---|---|---|
| 6,407,560 B1* | 6/2002 | Walraven et al. | 324/754.23 |
| 7,232,714 B2* | 6/2007 | Kato et al. | 438/166 |
| 2003/0235971 A1 | 12/2003 | Yamazaki et al. | |
| 2012/0028389 A1 | 2/2012 | Jin et al. | |
| 2013/0153028 A1* | 6/2013 | Hayashi et al. | 136/258 |

FOREIGN PATENT DOCUMENTS

| | | |
|---|---|---|
| JP | 9-237767 A | 9/1997 |
| JP | 2003-229432 A | 8/2003 |
| KR | 10-2012-0010841 A | 2/2012 |
| WO | WO 97/23806 A1 | 7/1997 |

OTHER PUBLICATIONS

Japanese Patent Abstract for Publication No. JP 10-201345 A, published Aug. 4, 1998, which corresponds to Japanese Application No. 9-237767 A, 1 page.

* cited by examiner

*Primary Examiner* — Mark Halpern
(74) *Attorney, Agent, or Firm* — Christie, Parker & Hale, LLP

(57) ABSTRACT

A method of controlling a laser beam annealing apparatus to manufacture a thin film transistor substrate, the method including: irradiating a laser beam emitted from a laser beam irradiator onto an amorphous silicon layer on a substrate supported by a substrate support; obtaining photographic data with respect to at least a part of the substrate by using a photographic unit; and adjusting a position of at least one of the substrate support or the laser beam irradiator by using a position adjuster based on the photographic data obtained by the photographic unit.

20 Claims, 5 Drawing Sheets

METHOD OF CONTROLLING A LASER BEAM ANNEALING APPARATUS TO MANUFACTURE THIN FILM TRANSISTOR SUBSTRATE

CROSS-REFERENCE TO RELATED APPLICATION

This application claims priority to and the benefit of Korean Patent Application No. 10-2013-0028818, filed on Mar. 18, 2013, in the Korean Intellectual Property Office, the disclosure of which is incorporated herein in its entirety by reference.

BACKGROUND

1. Field

Embodiments of the present invention relate to a laser beam annealing apparatus and a method of controlling the same.

2. Description of the Related Art

Generally, in the case of organic light-emitting displays or liquid crystal displays, whether each pixel emits light or not or how intense of light is emitted by each pixel is controlled by using a thin film transistor. The thin film transistor includes a semiconductor layer, a gate electrode, and source/drain electrodes. As to the semiconductor layer, polysilicon formed by crystallizing amorphous silicon is generally used.

In a process of manufacturing a thin film transistor substrate including the thin film transistor or a display apparatus using the same, an amorphous silicon layer may be formed on an entire surface of a substrate, crystallized into a polysilicon layer, and the polysilicon layer may be patterned so that a part thereof, on which the thin film transistor is located, remains, thereby manufacturing the thin film transistor substrate or the display apparatus including the thin film transistor substrate.

However, in general processes as described above, to crystallize amorphous silicon layer into polysilicon, much cost and/or a lot of time are used, and the processes thereof may also be complicated.

SUMMARY

Aspects of embodiments of the present invention are directed toward a laser beam annealing apparatus capable of accurately annealing a part (e.g., a preset part) of amorphous silicon and a method of controlling the laser beam annealing apparatus.

According to an embodiment of the present invention, there is provided a laser beam annealing apparatus including a substrate support configured to support a substrate on which a silicon layer is formed, a laser beam irradiator configured to irradiate a laser beam onto the silicon layer, a photographic unit configured to obtain data with respect to at least a part of the substrate, and a position adjuster configured to adjust a position of at least one of the substrate support or the laser beam irradiator based on the data obtained by the photographic unit.

The at least the part of the substrate may comprise a border between an area of the silicon layer onto which the laser beam is irradiated by the laser beam irradiator and an area of the silicon layer that is not irradiated, and a marker on the substrate.

The apparatus may further include a controller configured to obtain the data obtained by the photographic unit and transfer position adjustment information to the position adjuster, wherein the information is related to a distance between the marker and the border.

The controller may be configured to obtain the information related to the distance between the marker and the border by using brightness data.

The controller may be configured to compare the distance between the marker and the border with a reference distance and transfer the position adjustment information to the position adjuster.

The position information transferred from the controller may include a difference between the reference distance and the distance between the marker and the border.

The position adjuster may be configured to adjust the position of at least one of the substrate support or the laser beam irradiator by the difference between the reference distance and the distance between the marker and the border.

The information related to the distance may include information of a first distance between the marker and a border located in one direction from the marker and information of a second distance between the marker and a border located in another direction from the marker, and wherein the controller is configured to compare the first distance with the second distance and to transfer the position adjustment information to the position adjuster.

The position information transferred from the controller may include half of a difference between the first distance and the second distance.

The position adjuster may be configured to adjust a position of at least one of the substrate support or the laser beam irradiator by half of a difference between the first distance and the second distance.

The at least the part of the substrate may comprise a first marker and a second marker that are separately formed on the substrate, and a first portion adjacent to the first marker and a second portion adjacent to the second marker, wherein the first portion and the second portion are at a border between an area of the silicon layer onto which the laser beam is irradiated by the laser beam irradiator and an area of the silicon layer that is not irradiated.

The second portion may be adjacent to the second marker and in a same direction as that from the first marker to the first portion.

The apparatus may further include a controller configured to obtain the data obtained by the photographic unit and transfer position adjustment information to the position adjuster, wherein the information is related to a first distance between the first marker and the first portion and a second distance between the second marker and the second portion.

The controller may be configured to obtain the information related to the first distance and the second distance by using brightness data.

The controller may be configured to compare the first distance with the second distance and transfer the position adjustment information to the position adjuster.

The position information transferred from the controller may include a ratio of a distance between the first marker and the second marker to a difference between the first distance and the second distance.

The position adjuster may be configured to adjust a position of at least one of the substrate support or the laser beam irradiator according to the ratio.

The photographic unit may include a first photographic unit configured to obtain data with respect to an area including the first marker and the first portion; and a second photographic unit configured to obtain data with respect to an area including the second marker and the second portion.

The laser beam may form an incident area extending along a direction while incident to the silicon layer.

The laser beam irradiator may be configured to irradiate the laser beam onto a plurality of areas separated from one another on the silicon layer.

According to another embodiment of the present invention, there is provided a method of controlling a laser beam annealing apparatus, the method including irradiating a laser beam emitted from a laser beam irradiator onto a silicon layer on a substrate supported by a substrate support, the substrate including a marker; obtaining photographic data with respect to an area including the marker of the substrate and a border between an area of the silicon layer onto which the laser beam is irradiated and an area of the silicon layer that is not irradiated; and adjusting a position of at least one of the substrate support or the laser beam irradiator based on the obtained photographic data.

The adjusting may include obtaining information with respect to a distance between the marker and the border from the obtained photographic data and adjusting the position of at least one of the substrate support or the laser beam irradiator based on the information.

According to still another embodiment of the present invention, there is provided a method of controlling a laser beam annealing apparatus, the method including: irradiating a laser beam emitted from a laser beam irradiator onto a silicon layer on a substrate supported by a substrate support, the substrate including a first marker and a second marker that are separately formed; obtaining photographic data with respect to an area including the first marker, the second marker, a first portion adjacent to the first marker, and a second portion adjacent to the second marker, wherein the first portion and the second portion are at a border between an area of the silicon layer onto which the laser beam is irradiated and an area of the silicon layer that is not irradiated; and adjusting a position of at least one of the substrate support or the laser beam irradiator based on the obtained photographic data.

The adjusting may include obtaining information with respect to a first distance between the first marker and the first portion and a second distance between the second marker and the second portion from the obtained photographic data and adjusting the position of at least one of the substrate support or the laser beam irradiator based on the information.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
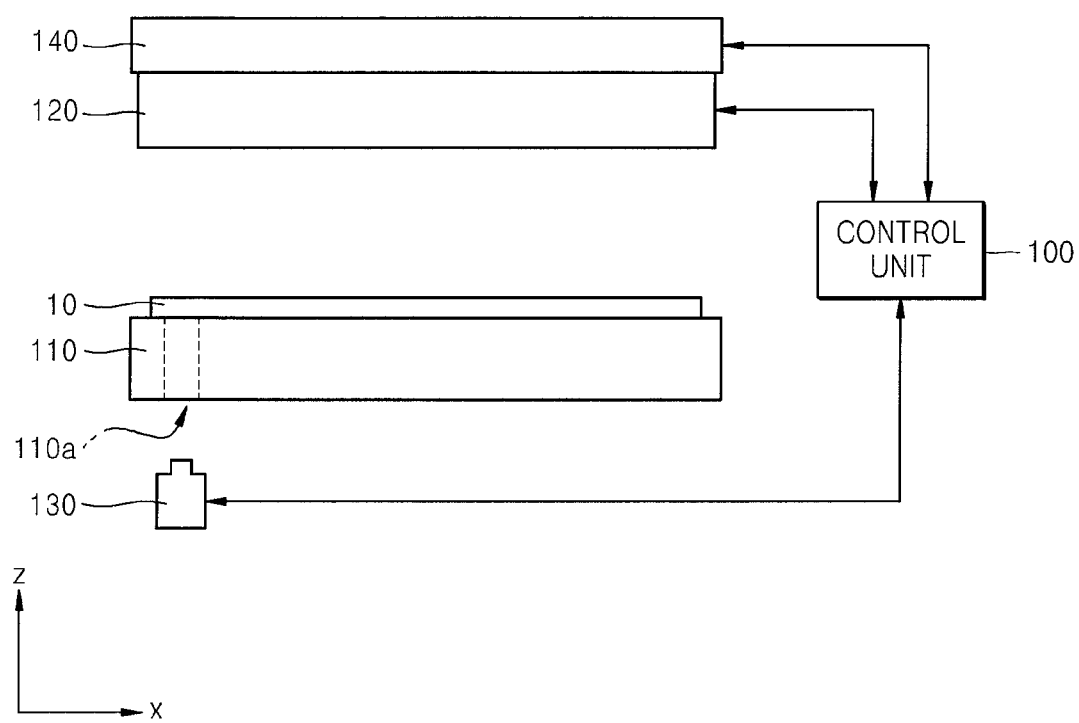
FIG. 1 is a concept view schematically illustrating a laser beam annealing apparatus and a substrate located on the laser beam annealing apparatus, according to an embodiment of the present invention.

Hereinafter, the present invention will now be described more fully with reference to the accompanying drawings, in which exemplary embodiments of the present invention are shown. The present invention may, however, be embodied in many different forms and should not be construed as being limited to the embodiments set forth herein; rather, these embodiments are provided so that this disclosure will be thorough and complete, and will fully convey the concept of the present invention to those skilled in the art. In the drawings, the thicknesses of layers and regions are exaggerated or contracted for convenience of description.

In the following embodiments, an x-axis, a y-axis, and a z-axis are limited to three axes on an orthogonal coordinate system but may be understood as a broader meaning including the same. For example, the x-axis, the y-axis, and z-axis may be orthogonal to one another but may indicate different directions that are not orthogonal to one another.

On the other hand, it will be understood that when an element, such as a layer, a film, a region, or a plate, is referred to as being "on" another element, it may be directly on the other element or intervening elements may be present therebetween.

FIG. 1 is a concept view schematically illustrating a laser beam annealing apparatus and a substrate 10 disposed (or located) on the laser beam annealing apparatus, according to an embodiment of the present invention. The laser beam annealing apparatus includes a substrate supporting unit (or substrate support) 110, a laser beam irradiating unit (or laser beam irradiator of laser beam emitter) 120, a photographic unit (or photography unit) 130, and a position adjusting unit (or position adjuster) 140.

The substrate supporting unit 110 may support the substrate 10. In one embodiment, the substrate 10 is provided with an amorphous silicon layer formed on a top surface (in a +z direction). The amorphous silicon layer may be formed on the entire top surface of the substrate 10 or may be formed to cover most of the top surface of the substrate 10 except a part, such as an edge.

Seating the substrate 10 on the substrate supporting unit 110 may be performed in various forms. For example, a plurality of pins (not shown) configured to ascend or descend ascends along a z axis and projects from the top surface of the substrate supporting unit 110 in the z direction via a plurality of penetration holes (not shown) penetrating the substrate supporting unit 110. In one embodiment, the substrate 10 is seated on the plurality of pins by a transfer robot, and then the plurality of pins descends to allow the substrate 10 to be seated on the substrate supporting unit 110 and to be supported. Before the plurality of pins descend, a process of aligning the substrate 10 and the substrate supporting unit 110 may be further performed.

The laser beam irradiating unit 120 may irradiate (or emit) a laser beam onto the silicon layer formed on the substrate 10 supported by the substrate supporting unit 110. Through this, the amorphous silicon layer on the substrate 10 may be crystallized to be a crystalline silicon layer. In this case, the laser beam irradiating unit 120 does not irradiate the laser beam onto the entire silicon layer on the substrate 10 but irradiates only onto an area (e.g., a preset area), that is, an area corresponding to a part on which a thin film transistor is located.

The laser beam emitted by the laser beam irradiating unit 120 may be a spot beam or a line beam. In the case of the spot beam, a laser beam in the form of a spot beam is irradiated (or emitted) while moving in a direction (e.g., a preset direction). In the case of the line beam, a laser beam is simply irradiated. Accordingly, the laser beam irradiated by the laser beam irradiating unit 120 forms an incident area extending along a direction (e.g., a preset direction) while being incident to the silicon layer.

Accordingly, to irradiate the laser beam onto the entire surface of the silicon layer on the substrate 10, a laser beam should be scanned for a long time while changing areas to be irradiated. However, in the present embodiment, in the case of the laser beam annealing apparatus, the laser beam is not irradiated onto the entire silicon layer on the substrate 10 but irradiated only onto an area (e.g., a preset area), that is, the area corresponding to the part on which the thin film transistor is located. That is, the laser beam irradiating unit 120 irradiates a laser beam onto a plurality of areas separated from one another on the silicon layer formed on the substrate 10 supported by the substrate supporting unit 110. Accordingly, when crystallizing the amorphous silicon layer by using the laser beam annealing apparatus according to the present embodiment, it is possible to innovatively reduce an amount of time it takes to crystallize the amorphous silicon layer.

The photographic unit 130 may obtain data with respect to at least a part of the substrate 10, on which the silicon layer is formed and which is supported by the substrate supporting unit 110. For this, the photographic unit 130 may include a photographic device such as a charge-coupled device (CCD) and/or a complementary metal-oxide semiconductor (CMOS) imaging device. The photographic unit 130 may be located at various positions, for example, as shown in the drawing, below the substrate supporting unit 110 (in a −z direction). In this case, to allow the photographic unit 130 to obtain data with respect to at least a part of the substrate 10, on which the silicon layer is formed and which is supported by the substrate supporting unit 110, a penetration hole 110a may be formed in the substrate supporting unit 110 for the photographic unit 130.

The position adjusting unit 140 may adjust a position of at least one of the substrate supporting unit 110 or the laser beam irradiating unit 120 based on the data obtained by the photographic unit 130. In the drawing, the position adjusting unit 140 is shown to be capable of adjusting a position of the laser beam irradiating unit 120.

As described above, in the present embodiment, in the case of the laser beam annealing apparatus, the laser beam is not irradiated onto the entire silicon layer on the substrate 10 but irradiated only onto an area (e.g., a preset area), that is, the area corresponding to the part on which the thin film transistor is located. Accordingly, a position relation between the substrate supporting unit 110 and the laser beam irradiating unit 120 may be maintained as a position relation (e.g., a preset position relation). However, when continuously using the laser beam annealing apparatus, the position relation between the substrate supporting unit 110 and the laser beam irradiating unit 120 may become different (or may deviate) from the position relation (e.g., the preset position relation). In this case, a defect (or error) may occur, in which the area of the silicon layer on the substrate 10, onto which the laser beam is to be irradiated upon, is different from the preset area.

However, in the case of the laser beam annealing apparatus, the position adjusting unit 140 may adjust the position of at least one of the substrate supporting unit 110 or the laser beam irradiating unit 120, based on the data obtained by the photographic unit 130, thereby effectively reducing (or preventing) continuous occurrence of the defect.

Figure 2:
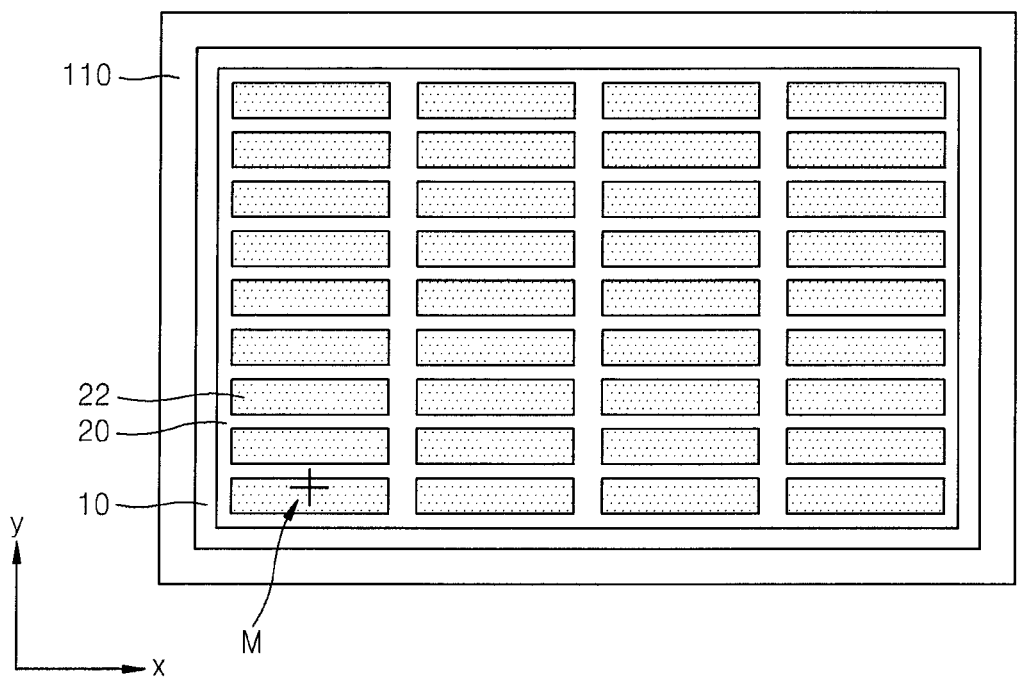
FIG. 2 is a top view illustrating a part of the laser beam annealing apparatus shown in FIG. 1 and the substrate located thereon.

FIG. 2 is a top view illustrating a part of the laser beam annealing apparatus and the substrate 10 disposed (or located) thereon. In FIG. 2, the laser beam is irradiated onto the area (e.g., the preset area) of the amorphous silicon layer on the substrate 10 disposed (or located) on the substrate supporting unit 110, the irradiated area is crystallized into a polysilicon layer 22, and an area that is not irradiated remains as an amorphous silicon layer 20.

As described above, the laser beam is irradiated onto the area (e.g., the preset area) of the amorphous silicon layer on the substrate 10, the irradiated area becomes the polysilicon layer 22, and then the photographic unit 130 obtains the data. The part that is an object for which data is obtained by the photographic unit 130 may include a border between the area of the silicon layer on which the laser beam is irradiated by the laser beam irradiating unit 120 and the area that is not irradiated, and a marker M may be formed on the substrate 10 supported by the substrate supporting unit 110. In this case, the border between the area on which the laser beam is irradiated by the laser beam irradiating unit 120 and the area not irradiated in the silicon layer may be understood to indicate a border between the polysilicon layer 22 and the amorphous silicon layer 20.

As described above, the position adjusting unit 140 may adjust a position of at least one of the substrate supporting unit 110 or the laser beam irradiating unit 120, based on the data obtained by the photographic unit 130. For this, a control unit (or a controller) 100 may be used. In this case, the control unit 100 may obtain information with respect to a distance of the border between the area to which the laser beam is irradiated by the laser beam irradiating unit 120 and the area not irradiated in the silicon layer and may transfer position adjustment information to the position adjusting unit 140. Hereinafter, this feature will be described in more detail.

Figure 3:
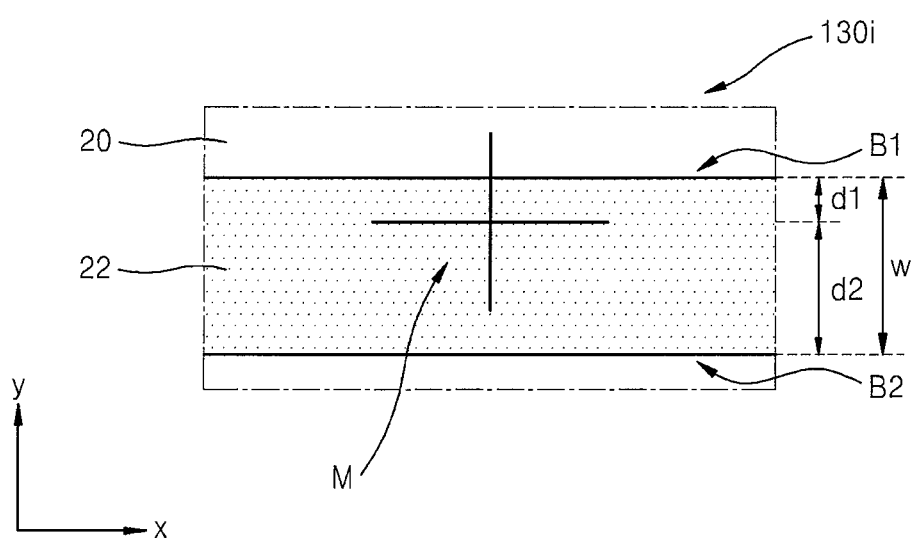
FIG. 3 is a concept view illustrating an image corresponding to data obtained by a photographic unit of the laser beam annealing apparatus shown in FIG. 1.
Figure 4:
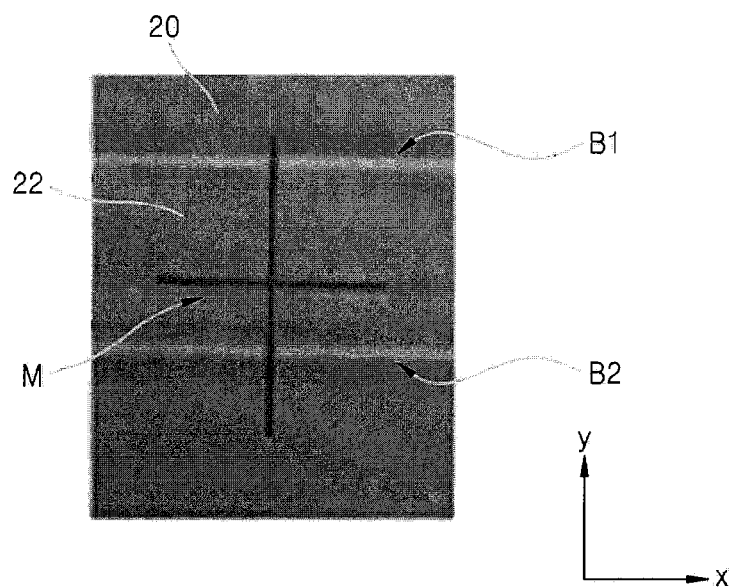
FIG. 4 is a concept view illustrating an actual image corresponding to data obtained by the photographic unit of the laser beam annealing apparatus shown in FIG. 1.

FIG. 3 is a concept view schematically illustrating an image 130i corresponding to data obtained by the photographic unit 130 of the laser beam annealing apparatus shown in FIG. 1, and FIG. 4 is a view illustrating an actual image obtained by the photographic unit 130 of the laser beam annealing apparatus shown in FIG. 1.

When the photographic unit 130 obtains data corresponding to the image 130i shown in FIG. 3, the control unit 100 analyzes the data and transfers position adjustment information to the position adjusting unit 140. In more detail, the control unit 100 obtains distance information including information of a first distance d1 between a first border B1 located in one direction, for example, in a +y direction, and the marker M, and information of a second distance d2 between a second border B2 located in another direction, for example, in a −y direction, and the marker M, with the marker M centered.

To obtain the information of the first distance d1 and the information of the second distance d2, a position of the marker M, a position of the first border B1, and a position of the second border B2, which may be determined based on the data obtained by the photographic unit 130, should be determined. For this, brightness data may be used among the data obtained by the photographic unit 130.

As illustrated by the image shown in FIG. 4, when the laser beam is irradiated onto the area (e.g., the preset area) of the amorphous silicon layer on the substrate 10 and only a corresponding part is formed to be polysilicon, the light transmittance of the polysilicon layer 22 is higher than that of the amorphous silicon layer 20, and additionally, the light transmittance of the first border B1 and the second border B2 between the amorphous silicon layer 20 and the polysilicon layer 22 is the highest. That is, according to the data obtained by the photographic unit 130, the brightness of the polysilicon layer 22 is higher than that of the amorphous silicon layer 20, and additionally, the brightness of the first border B1 and the second border B2 between the amorphous silicon layer 20 and the polysilicon layer 22 is the highest. Accordingly, the position of the marker M, the position of the first border B1, and the position of the second border B2 may be determined by using such differences in brightness.

As described above, the control unit 100 determines the position of the marker M, the position of the first border B1, and the position of the second border B2, and obtains the distance information including the information of the first distance d1 between the first border B1 and the marker M and the information of the second distance d2 between the second border B2 and the marker M. The first border B1 may be located in one direction from the marker M, for example, in a +y direction from the marker M, and the second border B2 may be located in another direction from the marker M, for example, in a −y direction from the marker M. After that, the control unit 100 compares the first distance d1 with the second distance d2 and transfers the position adjustment information to the position adjusting unit 140. In this case, the transferred position information contains information of a half of a difference between the first distance d1 and the second distance d2.

The position adjusting unit 140 adjusts the position of at least one of the substrate supporting unit 110 or the laser beam irradiating unit 120 by the half of the difference between the first distance d1 and the second distance d2. In the drawing, it is shown that the position adjusting unit 140 may control the position of the laser beam irradiating unit 120. In this case, as shown in FIG. 3, when the marker M is more adjacent to (or closer to) the first border B1 than to the second border B2, the position of the laser beam irradiating unit 120 is moved in a −y direction by the half of the difference between the first distance d1 and the second distance d2, thereby irradiating a laser beam onto a definite position (or an accurate position) when scanning the laser beam onto a silicon layer on a substrate inserted hereafter.

When the position of the laser beam irradiating unit 120 is to be adjusted when there is a deviation between the first distance d1 and the second distance d2 that is recognized by the control unit 100, the position of the laser beam irradiating unit 120 may not always be moved by the half of the difference between the first distance d1 and the second distance d2. For example, when the laser beam irradiating unit 120 is moved by a distance such as 1.0 cm, a position of a laser beam arriving at (or emitted on) the substrate 10 may be moved by a distance such as 2.0 cm. In that case, the position of the laser beam irradiating unit 120 may be adjusted by a quarter of the difference between the first distance d1 and the second distance d2 instead of the half thereof. This may be due to an additional optical system existing between the laser beam irradiating unit 120 and the substrate supporting unit 110 or due to an optical system inside the laser beam irradiating unit 120.

On the other hand, in a laser beam annealing apparatus according to another embodiment of the present invention, a method of generating position information in the control unit 100 may be different from the description above.

In the case of the laser beam annealing apparatus according to the present embodiment, the control unit 100 may check only the first distance d1 between the marker M and one border, for example, the first border B1 between the area onto which the laser beam is irradiated by the laser beam irradiating unit 120 (e.g., the polysilicon layer 22) and the area not irradiated at the silicon layer (e.g., the amorphous silicon layer 20). That is, the second distance d2 between the second border B2 and the marker M is not checked. After that, the control unit 100 compares the first distance d1 with the second distance d2 and transfers the position adjustment information to the position adjusting unit 140.

As the laser beam is emitted from the laser beam irradiating unit 120 of the laser beam annealing apparatus according to the present embodiment and as the laser beam is incident on the silicon layer on the substrate 10, the control unit 100 may take into account a width W of the area of the silicon layer, onto which the laser beam is irradiated, which may be a preset width. Accordingly, by comparing a reference distance (e.g., a preset reference distance) related to the width W, which is fixed, with the distance d1, which is first checked by the control unit 100, it is possible to determine whether the substrate supporting unit 110 and the laser beam irradiating unit 120 are aligned properly.

For example, the preset reference distance may be a half of the width W. In this case, when the first checked distance d1 is the same as the preset reference distance (e.g., half of the width W), it may be determined that the substrate supporting unit 110 and the laser beam irradiating unit 120 are aligned properly.

When the first checked distance d1 is different from the preset reference distance (e.g., half of the width W), it is determined that the substrate supporting unit 110 and the laser beam irradiating unit 120 are not aligned properly. Then the control unit 100 transfers position information to the position adjusting unit 140 to allow the position adjusting unit 140 to adjust the position of at least one of the substrate supporting unit 110 or the laser beam irradiating unit 120. In this case, the position information transferred from the control unit 100 may be information with respect to the difference between the preset reference distance (e.g., half of the width W) and the first distance d1, which is a distance between the first border B1 (which is between the area of the silicon layer, onto which the laser beam is irradiated by the laser beam irradiating unit 120, e.g., the polysilicon layer 22, and the area not irradiated, e.g., the amorphous silicon layer 20) and the marker M.

The position adjusting unit 140 receiving the position information may adjust the position of at least one of the substrate supporting unit 110 or the laser beam irradiating unit 120 by the difference between the preset reference distance (e.g., half of the width W) and the first distance d1 (which is between the first border B1 between the area of the silicon layer onto which the laser beam is irradiated by the laser beam irradiating unit 120, that is, the polysilicon layer 22, and the area not irradiated, that is, the amorphous silicon layer 20 and the marker M).

In the drawing, it is shown that the position adjusting unit 140 may control the position of the laser beam irradiating unit 120. However, as shown in FIG. 3, when the marker M is more adjacent to the first border B1 than to the second border B2, the position of the laser beam irradiating unit 120 is moved in a −y direction by a distance equal to the difference between the first distance d1 and the preset reference distance (e.g., half of the width W), thereby scanning a laser beam onto a definite position (or an accurate position) when scanning the laser beam onto a silicon layer on a substrate inserted hereafter.

When the position of the laser beam irradiating unit 120 may be adjusted when there is a difference between the first distance d1 recognized by the control unit 100 and the preset reference distance (e.g., half of the width W), the position of the laser beam irradiating unit 120 may not always be moved by the difference between the first distance d1 and the preset reference distance (e.g., half of the width W). For example, when the laser beam irradiating unit 120 is moved by a distance such as 1.0 cm, a position when a laser beam is emitted onto the substrate 10 may be moved by a distance such as 2.0 cm. In that case, the position of the laser beam irradiating unit 120 may be adjusted by half of the difference between the first distance d1 and the preset reference distance (e.g., half of the width W), instead of the whole difference. This may be due to an additional optical system existing between the laser beam irradiating unit 120 and the substrate supporting unit 110 or due to an optical system existing inside the laser beam irradiating unit 120.

Figure 5:
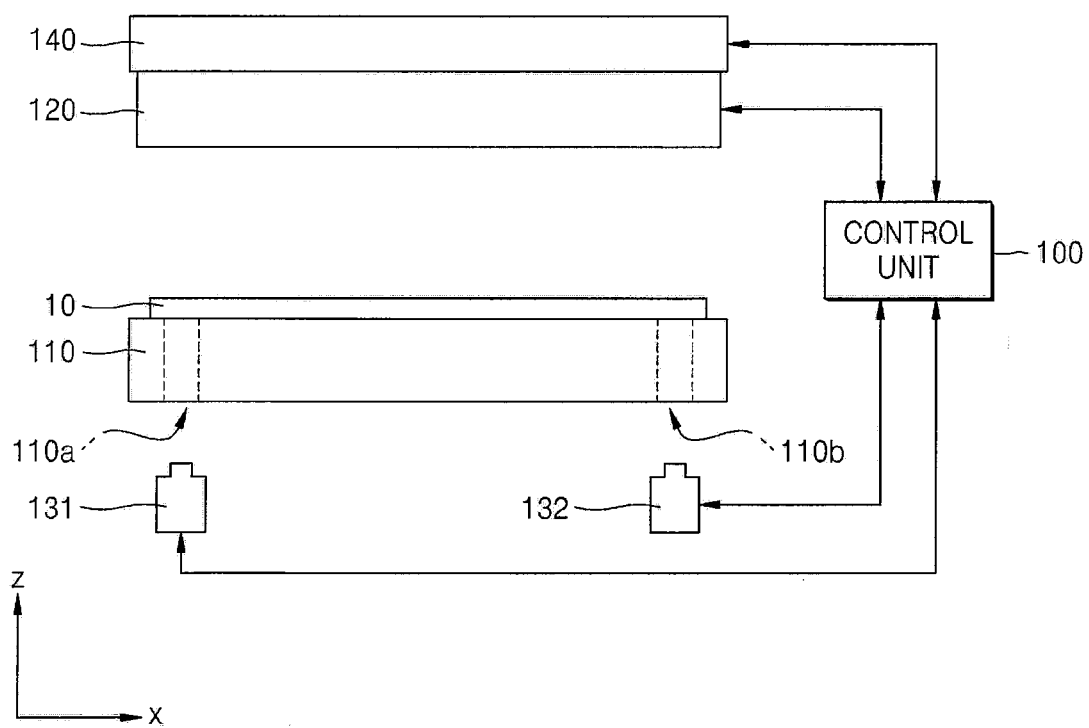
FIG. 5 is a concept view schematically illustrating a laser beam annealing apparatus and a substrate located on the laser beam annealing apparatus, according to another embodiment of the present invention.
Figure 6:
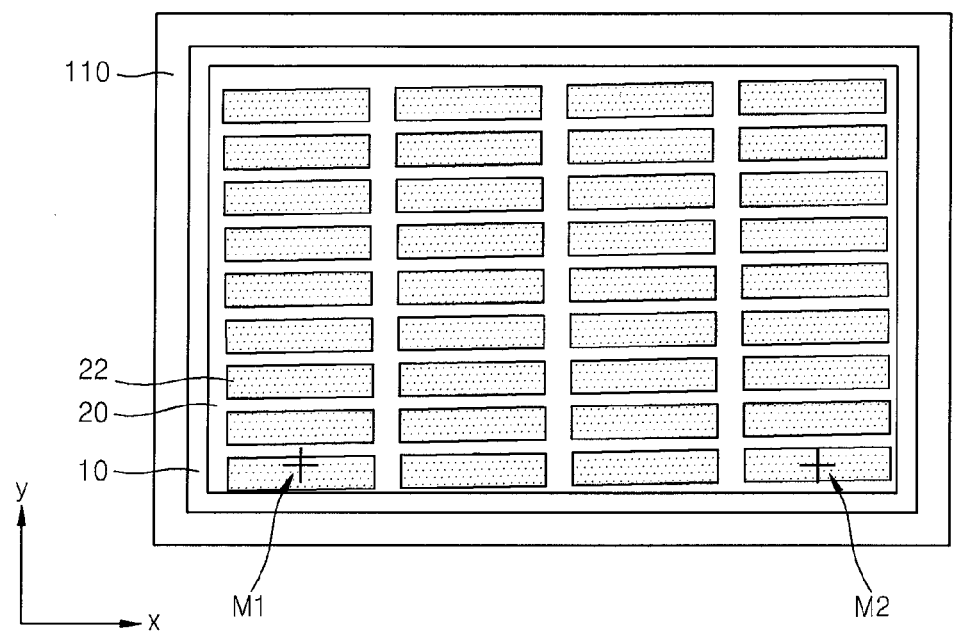
FIG. 6 is a top view illustrating a part of the laser beam annealing apparatus shown in FIG. 5 and the substrate located thereon.
Figure 7:
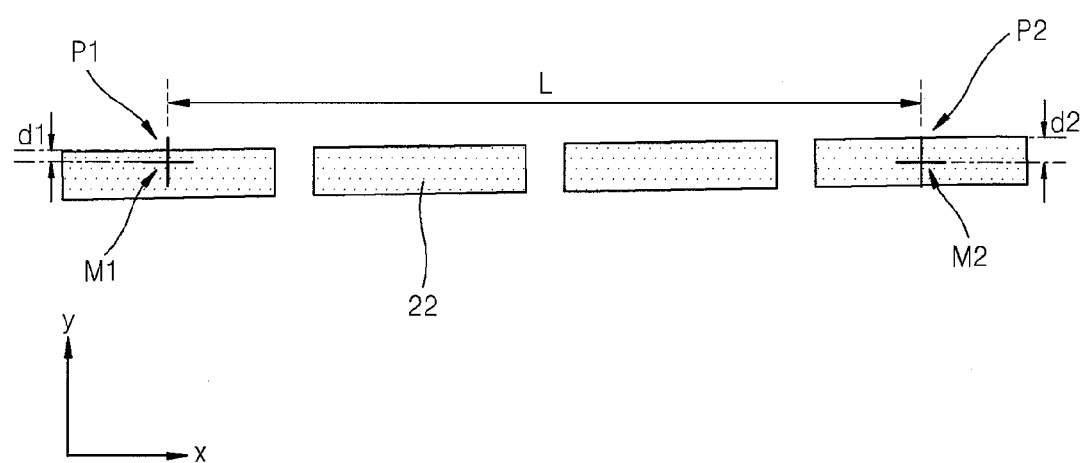
FIG. 7 is an enlarged concept view of the part shown in FIG. 6.
Figure 8:
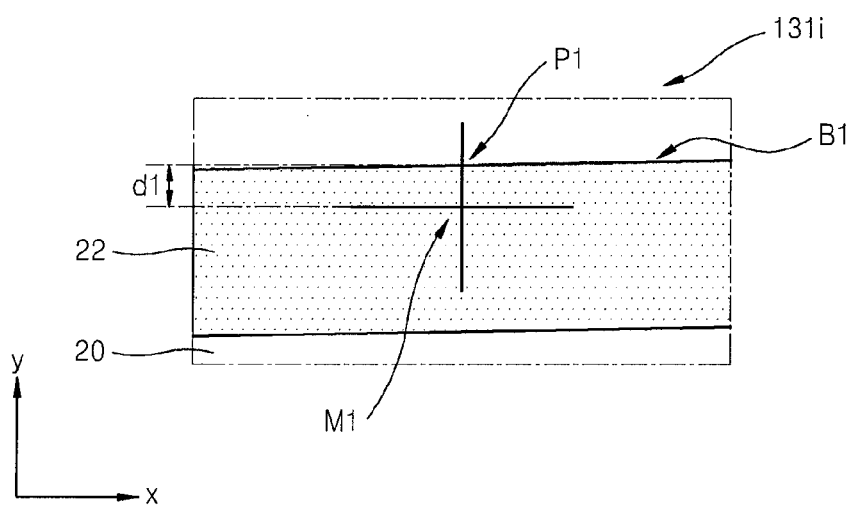
FIG. 8 is a concept view illustrating an image corresponding to data obtained by the first photographic unit of the laser beam annealing apparatus shown in FIG. 5.
Figure 9:
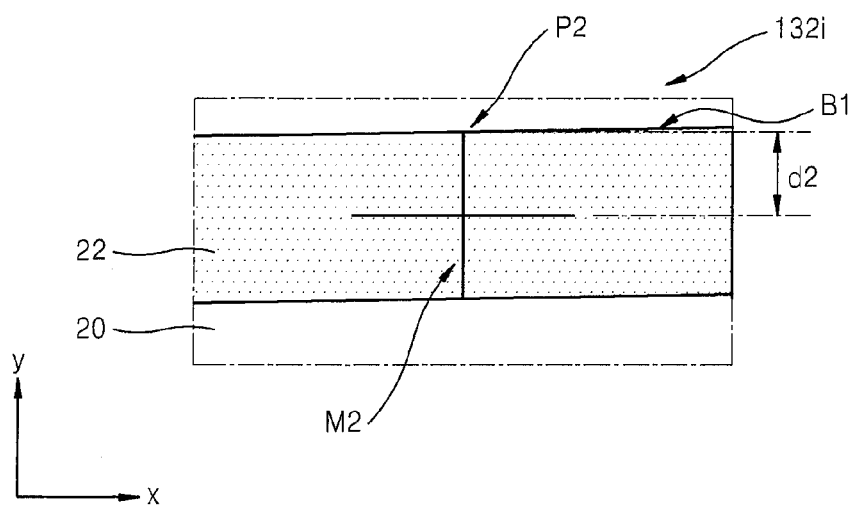
FIG. 9 is a concept view illustrating an image corresponding to data obtained by the second photographic unit of the laser beam annealing apparatus shown in FIG. 5.

FIG. 5 is a concept view schematically illustrating a laser beam annealing apparatus and a substrate 10 disposed (or located) on the laser beam annealing apparatus according to another embodiment of the present invention. FIG. 6 is a top view illustrating a part of the laser beam annealing apparatus shown in FIG. 5 and the substrate 10 disposed (or located) thereon. FIG. 7 is an enlarged concept view of the part shown in FIG. 6. FIG. 8 is a concept view illustrating an image 131i corresponding to data obtained by the first photographic unit 131 of the laser beam annealing apparatus shown in FIG. 5. FIG. 9 is a concept view illustrating an image 132i corresponding to data obtained by the second photographic unit 132 of the laser beam annealing apparatus shown in FIG. 5.

A photographic part of the laser beam annealing apparatus includes a first photographic unit (or first photography unit) 131 and a second photographic unit (or second photography unit) 132. In this case, a first marker M1 and a second marker M2 are separately formed on the substrate 10 supported by the substrate supporting unit 110.

The photographic part may obtain data with respect to at least a part of the substrate 10, supported by the substrate supporting unit 110, on which a silicon layer is formed. In this case and according to one embodiment, the part of the substrate 10 includes the first marker M1 and the second marker M2 that are separately formed on the substrate 10, a first portion P1 adjacent to the first marker M1 and a second portion P2 adjacent to the second marker M2 in a border between an area of the silicon layer onto which a laser beam is irradiated by the laser beam irradiating unit 120, that is, the polysilicon layer 22, and an area not irradiated, that is, the amorphous silicon layer 20. In this case, the second portion P2 may be a portion adjacent to the second marker M2 in the same direction as a direction from the first marker M1 to the first portion P1, for example, in a +y direction. That is, the first portion P1 may be most adjacent (or near) to a center of the first marker M1 in a +y direction in the border between the polysilicon layer 22 and the amorphous silicon layer 20, and the second portion P2 may be most adjacent (or near) to a center of the second marker M2 in a +y direction in the border between the polysilicon layer 22 and the amorphous silicon layer 20.

The first photographic unit 131 obtains data with respect to an area including the first marker M1 and the first portion P1 adjacent to the first marker M1 in the border between the polysilicon layer 22 and the amorphous silicon layer 20 via the penetration hole 110a of the substrate supporting unit 110, and the second photographic unit 132 obtains data with respect to an area including the second marker M2 and the second portion P2 adjacent to the second marker M2 in the border between the polysilicon layer 22 and the amorphous silicon layer 20 via a penetration hole 110b of the substrate supporting unit 110.

The control unit 100 may obtain information with respect to a first distance d1 between the first marker M1 and the first portion P1 and a second distance d2 between the second marker M2 and the second portion P2 from the data obtained by the first photographic unit 131 and the second photographic unit 132, respectively, and may then transfer position adjustment information to the position adjusting unit 140. The information with respect to the first distance d1 and the second distance d2 may be obtained by brightness data as described above.

The position adjustment information to be adjusted and transferred from the control unit 100 may be a result of comparing the first distance d1 with the second distance d2. In more detail, the control unit 100 may transfer information with respect to a ratio of a distance L between the first marker M1 and the second marker M2, which may be a preset distance, to a difference between the first distance d1 and the second distance d2. For example, the control unit 100 may transfer information related to $(d1-d2)/L$ as the position adjustment information to the position adjusting unit 140, and additionally, may transfer information of $\arctan[(d1-d2)/L]$ as the position adjustment information to the position adjusting unit 140.

According thereto, the position adjusting unit 140 may adjust one or more positions of the substrate supporting unit 110 and the laser beam irradiating unit 120 according to the ratio of the distance L between the first marker M1 and the second marker M2 to the difference between the first distance d1 and the second distance d2.

When there is a difference between the first distance d1 and the second distance d2, it refers to that relative positions of the substrate supporting unit 110 and the laser beam irradiating unit 120 deviate from each other, and in more detail, one thereof relatively rotates (or has been relatively displaced in a rotational direction) with respect to the other. Accordingly, information with respect to an angle of rotation as described above is transferred to the position adjusting unit 140 from the control unit 100 in such a way that the position adjusting unit 140 adjusts the position of at least one of the substrate supporting unit 110 or the laser beam irradiating unit 120 in an opposite direction to the angle of rotation, thereby accurately aligning the substrate supporting unit 110 with the laser beam irradiating unit 120. In this case, the angle of rotation may be understood as being $\arctan[(d1-d2)/L]$.

Through a method described above and according to one embodiment, a laser beam is accurately irradiated at a position (e.g., a preset position) on an amorphous silicon layer on a substrate inserted into the laser beam annealing apparatus hereafter, thereby forming a polysilicon layer at an accurate position (e.g., a preset accurate position).

On the other hand, although the laser beam annealing apparatus has been described, embodiments of the present invention are not limited thereto. For example, other methods of controlling the laser beam annealing apparatus may be within the scope of the present invention.

According to a method of controlling the laser beam annealing apparatus, according to an embodiment of the present invention, a laser beam emitted from the laser beam irradiating unit 120 is irradiated onto the substrate 10 supported by the substrate supporting unit 110. The substrate 10 includes the marker M and an amorphous silicon layer formed thereon, as shown in FIG. 2. After that, photographic data with respect to an area including the marker M and the first and second borders B1 and B2 between the area onto which the laser beam is irradiated, that is, the polysilicon layer 22, and the area not irradiated, that is, the amorphous silicon layer 20 on the silicon layer on the substrate 10 is obtained. After that, based on the obtained photographic data, a position of at least one of the substrate supporting unit 110 or the laser beam irradiating unit 120 may be adjusted.

Through this, a laser beam is irradiated to only an area (e.g., a preset area) instead of the entire surface of the silicon layer on the substrate 10, thereby not only quickly forming a polysilicon layer at a desired area but also forming a polysilicon layer at an accurate position on a substrate after that by immediately adjusting an error occurring between an area desired to form a polysilicon layer thereon and an area where the polysilicon layer is actually formed.

Adjusting the position of at least one of the substrate supporting unit 110 or the laser beam irradiating unit 120 may be accomplished by obtaining information with respect to distances between the marker M and the first and second borders B1 and B2 between the polysilicon layer 22 (that is, the area of the silicon layer onto which the laser beam is irradiated by the laser beam irradiating unit 120) and the amorphous silicon layer 20 (that is, the area not irradiated), and adjusting the position of at least one of the substrate supporting unit 110 or the laser beam irradiating unit 120 based on the information.

The information with respect to the distances between the first and second borders B1 and B2 and the marker M may be distance information including information of the first distance d1 between the marker M and the first border B1 located in one direction from the marker M, for example, in a +y direction from the marker M and information of the second distance d2 between the marker M and the second border B2 located in another direction from the marker M, for example, in a -y direction from the marker M, when the photographic unit 130 obtains data corresponding to the image 130i as shown in FIG. 3. A method of obtaining the information is the same as described above. The distance information, for example, may be half of a difference between the first distance d1 and the second distance d2.

The adjustment position of at least one of the substrate supporting unit 110 or the laser beam irradiating unit 120 based on the information may be the adjustment position of at least one of the substrate supporting unit 110 or the laser beam irradiating unit 120 by half of the difference between the first distance d1 and the second distance d2. For example, to adjust the position of the laser beam irradiating unit 120, as shown in FIG. 3, when the marker M is more adjacent to the first border B1 than to the second border B2, the position of the laser beam irradiating unit 120 is moved in a -y direction by half of the difference between the first distance d1 and the second distance d2, thereby scanning a laser beam onto a definite position (or accurate position) when scanning the laser beam onto a silicon layer on a substrate inserted hereafter.

When the position of the laser beam irradiating unit 120 may be adjusted and if there is a deviation (or a difference) between the first distance d1 and the second distance d2 that is recognized by the control unit 100, the position of the laser beam irradiating unit 120 may not be moved by half of the difference between the first distance d1 and the second distance d2. For example, when the laser beam irradiating unit 120 is moved by a distance such as 1.0 cm, the position of the laser beam emitted onto the substrate 10 may be moved by a distance such as 2.0 cm. In that case, the position of the laser beam irradiating unit 120 may be adjusted by a quarter of the difference between the first distance d1 and the second distance d2 instead of the half thereof. This may be due to an additional optical system existing between the laser beam irradiating unit 120 and the substrate supporting unit 110 or due to an optical system inside the laser beam irradiating unit 120.

On the other hand, according to a method of controlling a laser beam annealing apparatus according to another embodiment of the present invention, distance information to be used may be different from the description above.

For example, from photographic data, it is possible to check only the first distance d1 between the marker M and one border, for example, the first border B1 between the area onto which the laser beam is irradiated by the laser beam irradiating unit 120 (i.e., the polysilicon layer 22) and the area not irradiated at the silicon layer (i.e., the amorphous silicon layer 20). That is, the second distance d2 between the second border B2 and the marker M is not checked. After that, the adjusting of the position may be performed by analyzing the determined first distance d1.

In one embodiment, when the laser beam is emitted from the laser beam irradiating unit 120 and is incident to the silicon layer on the substrate 10, a width W of the area of the silicon layer, onto which the laser beam is irradiated, is a preset width. Accordingly in one embodiment, by comparing a reference distance (e.g., a preset reference distance) related to the width W (that is uniform) with the checked first distance d1, it is possible to check whether the substrate supporting unit 110 and the laser beam irradiating unit 120 are properly aligned.

For example, the preset reference distance may be a half of the width W. In this case, when the determined distance d1 is the same as the preset reference distance (e.g., half of the width W), it may be determined that the substrate supporting unit 110 and the laser beam irradiating unit 120 are aligned properly.

In one embodiment, when the determined distance d1 is different from the preset reference distance (e.g., half of the width W), it is determined that the substrate supporting unit 110 and the laser beam irradiating unit 120 are not aligned properly. Then, an adjustment of the position of at least one of the substrate supporting unit 110 or the laser beam irradiating unit 120 may be performed. In this case, the available position information may be information with respect to a difference between the first distance d1 (between the marker M and the first border B1 between the area of the silicon layer, onto which the laser beam is irradiated by the laser beam irradiating unit 120, that is, the polysilicon layer 22, and the area not irradiated, that is, the amorphous silicon layer 20) and the preset reference distance (for example, half of the width W).

In the adjusting of the position, it is possible to adjust the position of at least one of the substrate supporting unit 110 or the laser beam irradiating unit 120 by the difference between the first distance d1 (between the marker M and the first border B1 between the area of the silicon layer, onto which the laser beam is irradiated by the laser beam irradiating unit 120, that is, the polysilicon layer 22, and the area not irradiated, that is, the amorphous silicon layer 20) and the preset reference distance (for example, half of the width W).

As shown in FIG. 3 and according to one embodiment, when the marker M is more adjacent to the first border B1 than to the second border B2, the position of the laser beam irradiating unit 120 is moved in a −y direction by the difference between the first distance d1 and the preset reference distance (e.g., half of the width W), thereby scanning a laser beam onto a definite position (or an accurate position) when scanning the laser beam onto a silicon layer on a substrate inserted hereafter.

In one embodiment, when the position of the laser beam irradiating unit 120 should be adjusted when there is a difference between the first distance d1 recognized by the control unit 100 and the reference distance (e.g., the preset reference distance), for example, half of the width W, the position of the laser beam irradiating unit 120 may not be moved by the difference between the first distance d1 and the preset reference distance (for example, half of the width W). For example, when the laser beam irradiating unit 120 is moved by a distance such as 1, the position of the laser beam emitted onto the substrate 10 may be moved by a distance such as 2. In that case, the position of the laser beam irradiating unit 120 may be adjusted by a half of the difference between the first distance d1 and the preset reference distance (for example, half of the width W), instead of the whole difference. This may be due to an additional optical system existing between the laser beam irradiating unit 120 and the substrate supporting unit 110 or due to an optical system inside the laser beam irradiating unit 120.

According to a method of controlling the laser beam annealing apparatus, according to another embodiment of the present invention, a laser beam emitted from the laser beam irradiating unit 120 is irradiated onto the silicon layer on the substrate 10 supported by the substrate supporting unit 110 and including the first marker M1 and the second marker M2 that are separately formed and the silicon layer formed thereon, as shown in FIGS. 5 and 6.

After that, photographic data is obtained with respect to an area including the first portion P1 adjacent to the first marker M1 and the second portion P2 adjacent to the second marker M2 in the first border B1 (between the polysilicon layer 22 that is the area of the silicon layer, onto which the laser beam is irradiated, and the amorphous silicon layer 20 that is the area not irradiated), the first marker M1, and the second marker M2. The obtained data may be (1) photographic data with respect to an area including the first marker M1 and the first portion P1 and (2) photographic data with respect to an area including the second marker M2 and the second portion P2.

In this case, the second portion P2 may be a portion adjacent to the second marker M2 in the same direction as a direction from the first marker M1 to the first portion P1, for example, in a +y direction. That is, the first portion P1 may be most adjacent to a center of the first marker M1 in a +y direction in the border between the polysilicon layer 22 and the amorphous silicon layer 20, and the second portion P2 may be most adjacent to a center of the second marker M2 in a +y direction in the border between the polysilicon layer 22 and the amorphous silicon layer 20.

After that, based on the obtained photographic data, the position of at least one of the substrate supporting unit 110 or the laser beam irradiating unit 120 may be adjusted. Through this and according to one embodiment, it is possible to reduce an incidence rate of defects caused by unintended rotations between the substrate supporting unit 110 and the laser beam irradiating unit 120.

The adjusting may occur by obtaining information with respect to the first distance d1 between the first marker M1 and the first portion P1 and the second distance d2 between the second marker M2 and the second portion P2 from the obtained photographic data, and adjusting the position of at least one of the substrate supporting unit 110 or the laser beam irradiating unit 120 based on the information.

The information used in the adjusting may be a result of comparing the first distance d1 with the second distance d2. For example, the information may be information with respect to a ratio of a distance L between the first marker M1 and the second marker M2, which may be a preset distance, to a difference between the first distance d1 and the second distance d2. For example, the information may be information with respect to $(d1-d2)/L$, or additionally, $\arctan[(d1-d2)/L]$.

According thereto, when adjusting one or more positions of the substrate supporting unit 110 and the laser beam irradiating unit 120, the positions may be adjusted according to the ratio of the distance L between the first marker M1 and the second marker M2 to the difference between the first distance d1 and the second distance d2.

When there is a difference between the first distance d1 and the second distance d2, it may be understood that relative positions of the substrate supporting unit 110 and the laser beam irradiating unit 120 are deviated (or different) from each other, and for example, one thereof relatively rotates (or has been relatively displaced in a rotational direction) with respect to the other. Accordingly and according to one embodiment, information with respect to an angle of rotation as described above is utilized to adjust the position of at least one of the substrate supporting unit 110 or the laser beam irradiating unit 120 in an opposite direction to the angle of rotation, thereby accurately aligning the substrate supporting unit 110 with the laser beam irradiating unit 120. In this case, the angle of rotation may be understood as $\arctan[(d1-d2)/L]$.

Through a method described above and according to one embodiment, a laser beam is accurately irradiated to a position (e.g., a preset position) onto an amorphous silicon layer on a substrate inserted into the laser beam annealing apparatus, thereby forming a polysilicon layer at an accurate position (e.g., a preset accurate position).

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A method of controlling a laser beam annealing apparatus to manufacture a thin film transistor substrate, the method comprising:
   irradiating a laser beam emitted from a laser beam irradiator onto an amorphous silicon layer on a substrate supported by a substrate support;
   obtaining photographic data with respect to at least a part of the substrate by using a photographic unit; and
   adjusting a position of at least one of the substrate support or the laser beam irradiator by using a position adjuster based on the photographic data obtained by the photographic unit.

2. The method of claim 1, wherein the at least the part of the substrate comprises:
   a border between an area of the silicon layer onto which the laser beam is irradiated by the laser beam irradiator and an area of the silicon layer that is not irradiated; and
   a marker on the substrate.

3. The method of claim 2, wherein a controller is configured to obtain information related to a distance between the marker and the border from the photographic data, and the controller is configured to transfer position adjustment information to the position adjuster.

4. The method of claim 3, wherein the controller is configured to obtain the information related to the distance between the marker and the border by using brightness data.

5. The method of claim 3, wherein the controller is configured to compare the distance between the marker and the border with a reference distance and transfer the position adjustment information to the position adjuster.

6. The method of claim 5, wherein the position adjustment information transferred from the controller comprises a difference between the reference distance and the distance between the marker and the border.

7. The method of claim 6, wherein the position adjuster is configured to adjust the position of at least one of the substrate support or the laser beam irradiator by the difference between the reference distance and the distance between the marker and the border.

8. The method of claim 3, wherein the information related to the distance comprises information of a first distance between the marker and a border located in one direction from the marker and information of a second distance between the marker and a border located in another direction from the marker, and wherein the controller is configured to compare the first distance with the second distance and to transfer the position adjustment information to the position adjuster.

9. The method of claim 8, wherein the position adjustment information transferred from the controller comprises half of a difference between the first distance and the second distance.

10. The method of claim 8, wherein the position adjuster is configured to adjust a position of at least one of the substrate support or the laser beam irradiator by half of a difference between the first distance and the second distance.

11. The method of claim 1, wherein the at least the part of the substrate comprises a first marker and a second marker that are separately formed on the substrate, and a first portion adjacent to the first marker and a second portion adjacent to the second marker, wherein the first portion and the second portion are at a border between an area of the silicon layer onto which the laser beam is irradiated by the laser beam irradiator and an area of the silicon layer that is not irradiated.

12. The method of claim 11, wherein the second portion is adjacent to the second marker and in a same direction as that from the first marker to the first portion.

13. The method of claim 12, wherein a controller is configured to obtain information related to a first distance between the first marker and the first portion and a second distance between the second marker and the second portion from the photographic data, and the controller is configured to transfer position adjustment information to the position adjuster.

14. The method of claim 13, wherein the controller is configured to obtain the information related to the first distance and the second distance by using brightness data.

15. The method of claim 13, wherein the controller is configured to compare the first distance with the second distance and transfer the position adjustment information to the position adjuster.

16. The method of claim 15, wherein the position adjustment information transferred from the controller comprises a ratio of a distance between the first marker and the second marker to a difference between the first distance and the second distance.

17. The method of claim 16, wherein the position adjuster is configured to adjust a position of at least one of the substrate support or the laser beam irradiator according to the ratio.

18. The method of claim 12, wherein the photographic unit comprises:
a first photographic unit configured to obtain data with respect to an area comprising the first marker and the first portion; and
a second photographic unit configured to obtain data with respect to an area comprising the second marker and the second portion.

19. The method of claim 1, wherein the laser beam forms an incident area extending along a direction while incident to the silicon layer.

20. The method of claim 1, wherein the laser beam irradiator is configured to irradiate the laser beam onto a plurality of areas separated from one another on the silicon layer.

* * * * *